United States Patent [19]

Ohta et al.

[11] Patent Number: 5,270,623
[45] Date of Patent: Dec. 14, 1993

[54] METHOD OF CONTROLLING SPEED OF ROTATION OF MOTOR

[75] Inventors: Atsuo Ohta, Saitama; Yoshiaki Hirakata, Tokyo, both of Japan

[73] Assignee: Honda Giken Kogyo Kabushiki Kaisha, Tokyo, Japan

[21] Appl. No.: 979,485

[22] Filed: Nov. 20, 1992

Related U.S. Application Data

[63] Continuation of Ser. No. 806,792, Dec. 12, 1991, abandoned, which is a continuation of Ser. No. 588,136, Sep. 26, 1990, abandoned.

[30] Foreign Application Priority Data

Sep. 26, 1989 [JP] Japan .................................. 1-250155

[51] Int. Cl.[5] ............................................. H02F 7/00
[52] U.S. Cl. ..................................... 318/268; 388/840; 388/855
[58] Field of Search ............... 388/824, 838, 839, 840, 388/855; 318/57, 59, 60, 61, 434, 251, 265, 268, 521, 778, 783, 261–264, 269, 280, 296, 432, 433, 533; 361/23, 30, 31, 58

[56] References Cited

U.S. PATENT DOCUMENTS

| | | | |
|---|---|---|---|
| 1,016,060 | 1/1912 | Barnum | 318/375 |
| 3,581,172 | 5/1971 | Tsuboi et al. | 318/259 |
| 3,757,186 | 9/1973 | Ozawa | 388/840 |
| 3,815,001 | 6/1974 | Jamieson | 318/139 |
| 3,818,293 | 6/1974 | Wood, deceased et al. | 318/139 |
| 3,833,845 | 9/1974 | Smallbone et al. | 388/840 |
| 3,912,978 | 10/1975 | Poole | 361/31 X |
| 4,035,704 | 7/1977 | York | 318/251 X |
| 4,090,119 | 5/1978 | Griffith et al. | 318/432 |
| 4,093,900 | 6/1978 | Plunkett | 318/370 |
| 4,426,605 | 1/1984 | Steinbrecher | 388/855 |
| 4,500,925 | 2/1985 | Schemmann et al. | 318/783 X |
| 4,933,611 | 6/1990 | Albanesius et al. | 318/373 X |
| 4,980,619 | 12/1990 | Nishizawa | 318/268 X |

FOREIGN PATENT DOCUMENTS 62-157882 7/1987 Japan.

Primary Examiner—Jonathan Wysocki

[57] ABSTRACT

A method for controlling the speed of rotation of a motor by changing the resistance value of a resistor circuit connected in series to the motor and having discontinuous resistance values, including the steps of applying voltage across the motor. Detecting when the applied voltage is lower than a first applied voltage and the resistance value of the resistor circuit is a first resistance value and changing the resistance value of the resistor circuit over to a second resistance value lower than the first resistance value. Detecting when the applied voltage detected is higher than a second applied voltage higher than the first applied voltage and the resistance value of the resistor value is the second resistance value and changing the resistance value of the resistor circuit over to the first resistance value. The first applied voltage and the second voltage are set for permitting the current flowing through the motor by the first applied voltage to be higher than the current flowing through the motor by the second applied voltage.

30 Claims, 5 Drawing Sheets

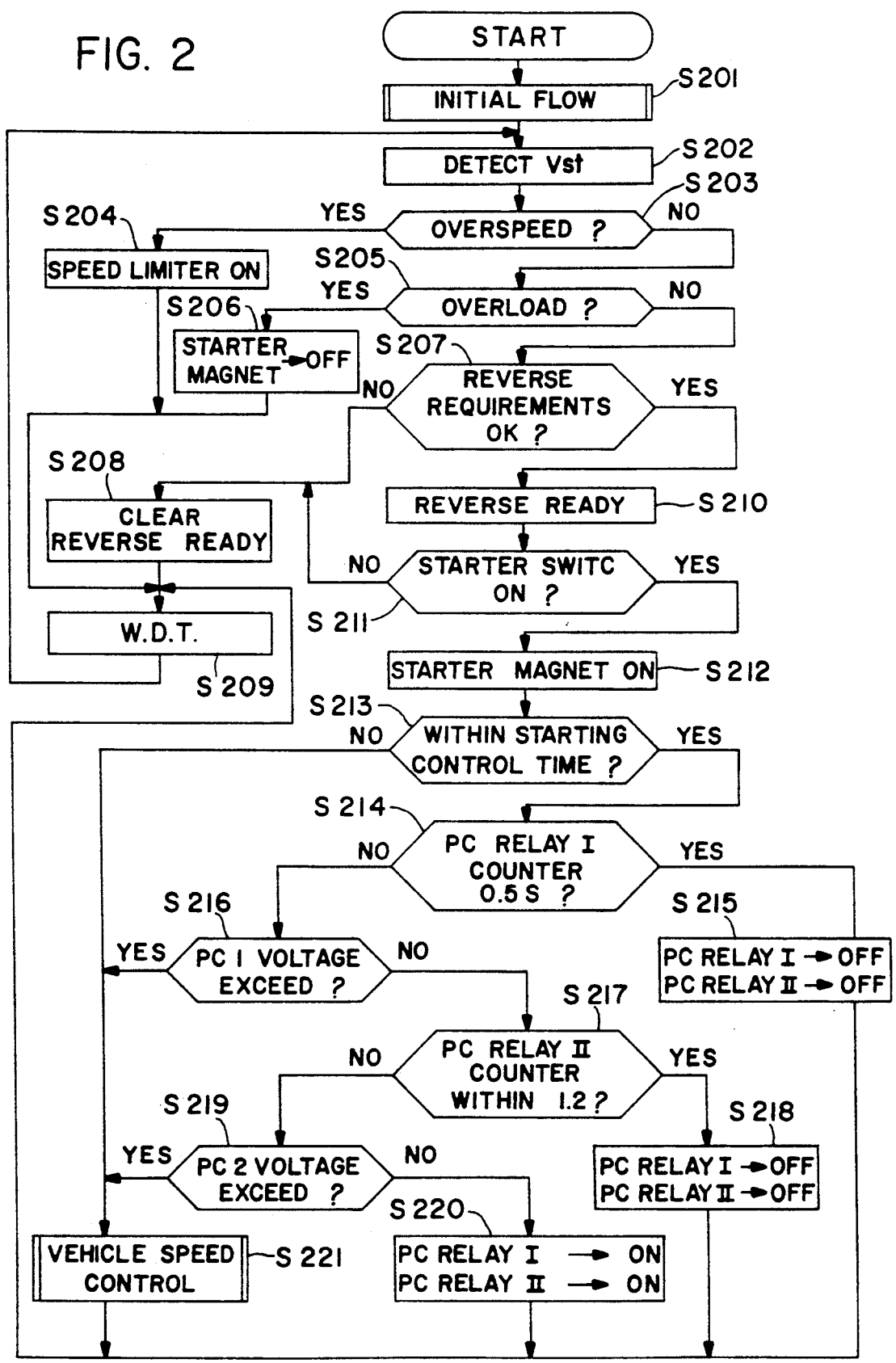

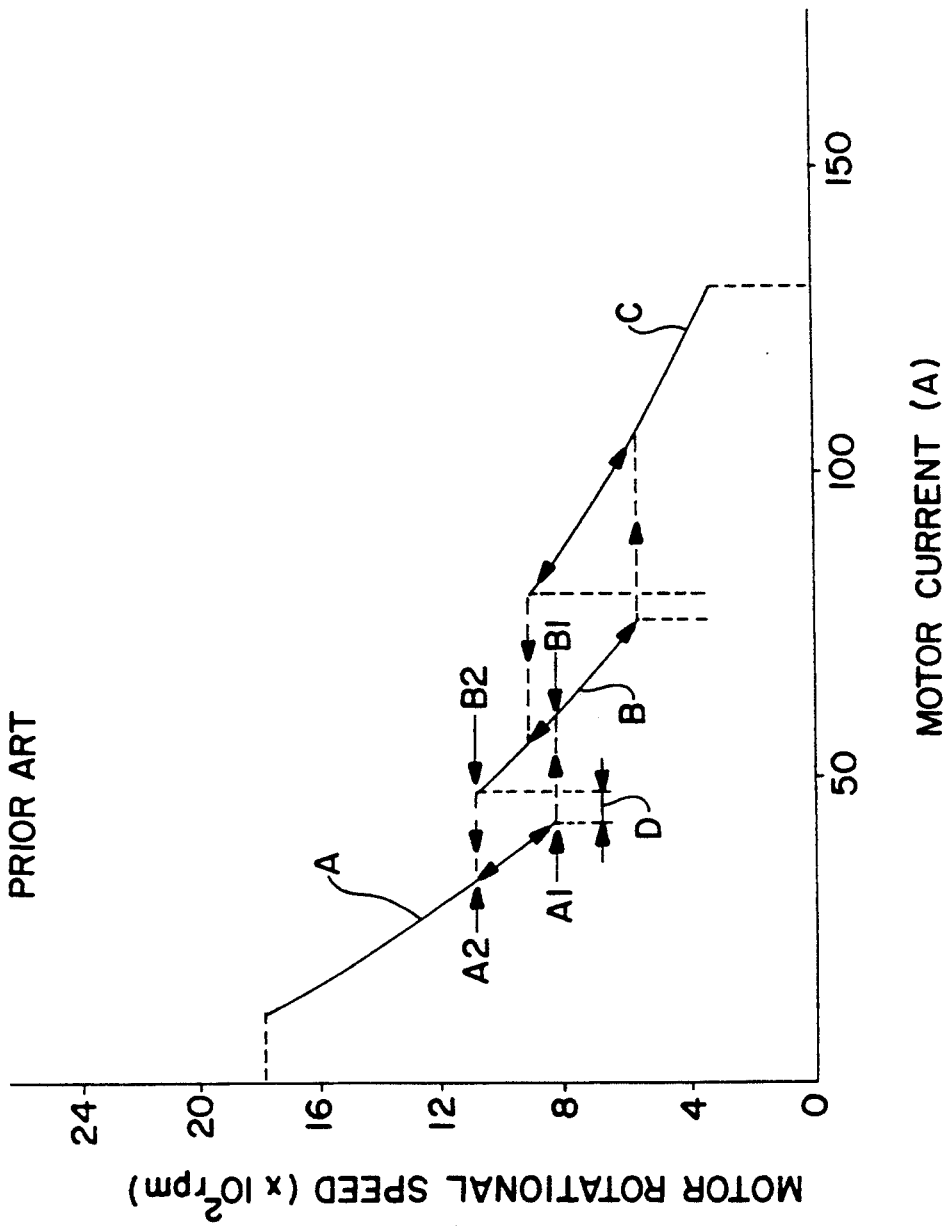

METHOD OF CONTROLLING SPEED OF ROTATION OF MOTOR

This application is a continuation of U.S. patent application Ser. No. 07/806,792 filed on Dec. 12, 1991, now abandoned, which is a continuation of U.S. patent application Ser. No. 07/588,136, filed on Sep. 26, 1990, now abandoned.

BACKGROUND OF THE INVENTION

1. Field of the Invention

This invention relates to a method of controlling the speed of rotation of a motor. More specifically, to a method of controlling the speed of rotation of a motor such that the value of a resistor circuit connected in series to the motor and having discontinuous resistance values is changed to control the speed of rotation of the motor to a substantially fixed level irrespective of a variation of a load to the motor. Above all, the present invention relates to a controlling method which can be applied to a device for controlling the speed of rotation of a starter motor for a vehicle which makes use of a driving force of the starter motor upon backward running of the vehicle.

2. Description of Background Art

A backward running device for a vehicle such as an autobicycle which makes use of driving force of a starter motor upon backward running of the vehicle is already known. One example is set forth in Japanese Patent Laid-Open No. 62-157882. A controlling mechanism of a simple structure for such a device includes current flowing through a starter motor which is changed by changing over a plurality of resistors provided between the motor and a power source to change the output power of the starter motor to cause the vehicle to smoothly run backwardly at a reduced speed.

For example, three resistors having different resistance values may be provided between a starter motor and a power source. If the resistors are changed over in response to a speed of rotation of the starter motor, then the current flowing through the starter motor and the speed of rotation of the motor have a relationship as shown in FIG. 5. In particular, the relationship between the motor current and the motor rotational speed changes along a curve, identified as curve A, when the motor current flows by way of a resistor having a high resistance value. However, the relationship changes along a curve, identified as curve B, when the motor current flows by way of another resistor having a medium resistance value. In addition, when the motor current flows by way of the remaining resistor having a low resistance value, the relationship changes along a curve, identified as curve C.

Accordingly, since there is a proportional relationship between the motor torque necessitated to cause the vehicle to run backwardly, that is, the motor load, and the motor current, it can be anticipated that the motor rotational speed is kept substantially constant irrespective of a change of the motor load by causing, while the motor load is low, the motor current to flow by way of the resistor of the high resistance value and by changing over the resistor to another resistor having a lower resistance value as the motor load increases.

However, while the changing over of the resistors is performed in response to a motor rotational speed, according to the setting of a motor rotational speed at which such changing over of the resistors is to be performed, the actual driving torque of the motor does not coincide with a torque required for the motor. It is possible that the speed of rotation of the motor may widely vary. In particular, it is assumed that, in the case of the curve A of FIG. 5, when the motor rotational speed is decreased, for example, because the required torque is high, and it is changed over, for example, at a point A1 of the curve A at which the speed of rotation is 800 rpm, to a point B1 of the curve B. However, if such a driving torque as can be obtained at the point B1 is not required, then the motor current decreases and the motor rotational speed increases. Then, if the driving torque is higher than a required torque even after, for example, a point B2 of the curve B at which the speed of rotation is 1,100 rpm is reached, that is, when the amount of the motor current corresponding to the required torque is in a region D between an amount of current at the point A1 and another amount of current at the point B2, the motor rotational speed again returns from the point B2 of the curve B to point A2 of curve A. Accordingly, when the required torque remains in a torque amount section such as represented by a current amount section D, the required torque does not coincide with a driving torque obtained in accordance with curve A nor with a driving torque obtained in accordance with curve B. Thus, changing over of control of the resistors falls into an endless loop which passes the points of A1, B1, B2 and A2. Consequently, a problem takes place wherein the speed of rotation of the motor increases and decreases frequently between 800 rpm and 1,100 rpm and is not stabilized.

SUMMARY AND OBJECTS OF THE INVENTION

The present invention has been made in view of such circumstances as described above, and it is an object of the present invention to provide a method of controlling the speed of rotation of a motor by which the motor rotational speed can be stably maintained even with a controlling device of a simple structure irrespective of a variation of a load to the motor.

In order to attain the object, according to the present invention, there is provided a method of controlling the speed of rotation of a motor by changing the resistance value of a resistor circuit connected in series to the motor and having discontinuous resistance values, characterized in that an applied voltage applied across the motor is detected and, when the applied voltage detected is lower than a first applied voltage and the resistance value of the resistor circuit is a first resistance value, the resistance value of the resistor circuit is changed over to a second resistance value lower than the first resistance value. However, when the applied voltage detected is higher than a second applied voltage which is higher than the first applied voltage and the resistance value of the resistor value is the second resistance value, the resistance value of the resistor circuit is changed over to the first resistance value, and the first applied voltage and the second voltage are set such that the current flowing through the motor by the first applied voltage is higher than the current flowing through the motor by the second applied voltage.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a program flow chart of the motor rotational speed control which is executed by an electronic control unit 22 of FIG. 1;

FIG. 5 is a graph illustrating changes of a motor current amount i and so forth according to the prior art.

DETAILED DESCRIPTION OF THE PREFERRED EMBODIMENTS

Figure 1:
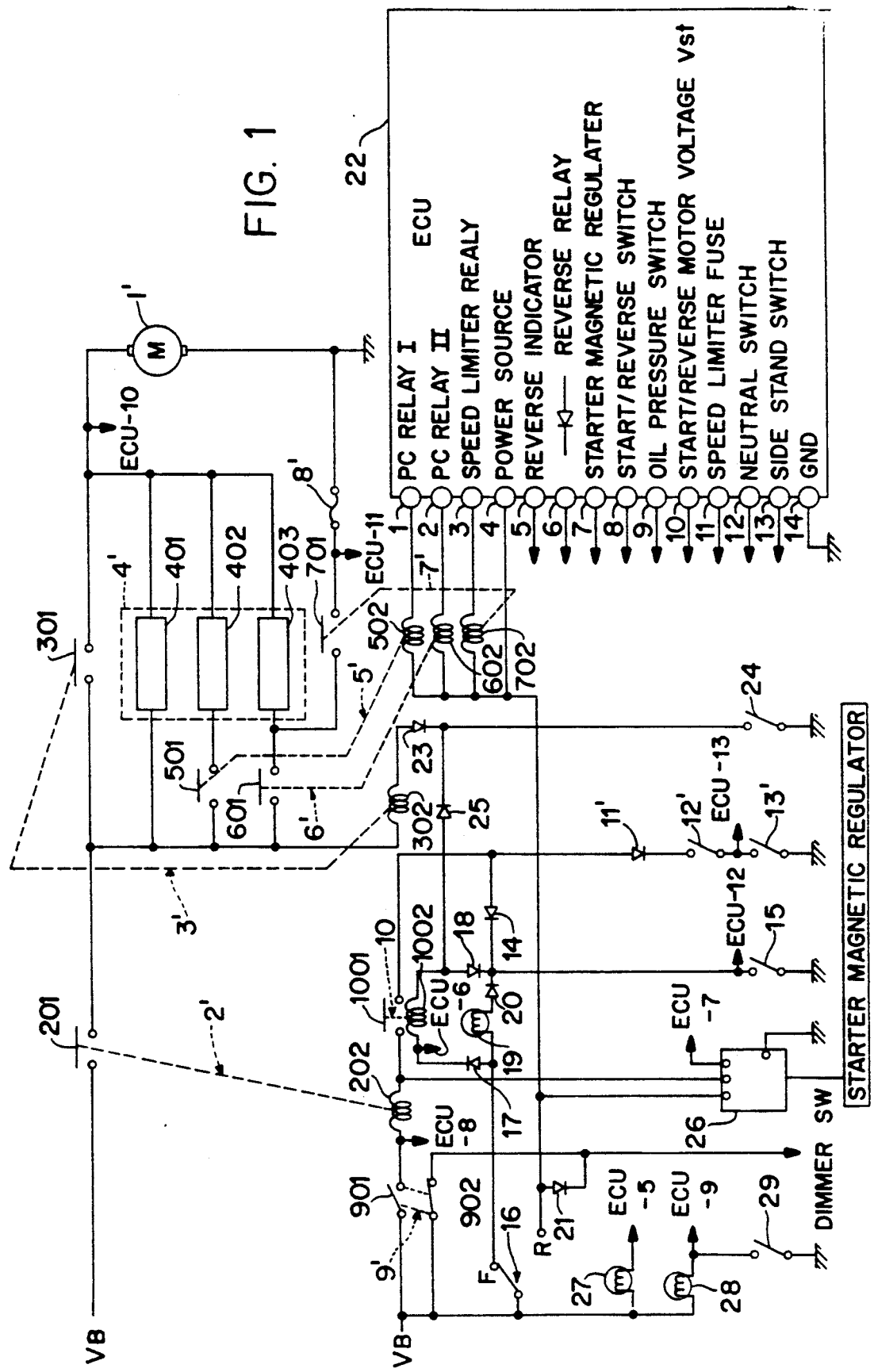
FIG. 1 is a constructional diagram of an entire device for controlling the speed of rotation of a motor to which the method of the present invention is applied.

FIG. 1 is a construction view of an entire device for controlling the speed of rotation of a motor to which the present invention is applied and in which a starter magnetic switch 201 of a starter magnetic relay 2' and a starter magnetic switch 301 of another starter magnetic relay 3' are provided. The battery voltage $V_B$ is supplied by way of a battery and an ignition switch not shown.

A resistor circuit 4' includes a three resistors 401, 402 and 403 of, for example, 150 mΩ. The resistor 401 is connected in parallel to the starter magnetic switch 301. The resistor 402 is connected in parallel to the starter magnetic switch 301 by way of a power control switch 501 of a power control relay 5' while the resistor 403 is connected in parallel to the starter magnetic switch 302 by way of a power control switch 601 of a power control relay 6'.

A connecting point between the power control switch 601 and the resistor 403 is grounded by way of a speed limiter switch 701 of a speed limiter relay 7' and a fuse 8'.

A manual start/reverse switch 9' consists of a switch 901 of the normally open type and another switch 902 of the normally closed type. Only while the start/reverse switch 9' is manually operated, the switch 901 is closed while the switch 902 is open.

The battery voltage $V_B$ is supplied to an end of the switch 901 while the other end of the switch 901 is grounded by way of a starter magnetic coil 202 of the starter magnetic relay 2', a reverse switch 1001 of a reverse relay 10', a diode 11', a clutch switch 12' and a side stand switch 13'. The clutch switch 12' is closed when a clutch lever is operated so that an engaging relationship between the engine and the driving wheel is interrupted while the side stand switch 13' is closed when a side stand for allowing the autobicycle to stand by itself is in an accommodated condition, more specifically, when the autobicycle is in a running condition or in a running standby condition. It is to be noted that the other end of the switch 901 is grounded also by way of the starter magnetic coil 222, the reverse switch 1001, a diode 14' and a neutral switch 15. The neutral switch 15 is a switch which is closed when a shift lever of a transmission is at a neutral position. Meanwhile, the battery voltage $V_B$ is supplied to an end of the switch 902 while the other end of the switch 902 is grounded to a headlight by way of a dimmer switch which also can function as an actuating switch for the headlight.

A reverse lever switch 16 is a manual change-over switch. The battery voltage $V_B$ is supplied to an end of the reverse lever switch 16 so that the reverse lever switch 16 supplies the battery voltage $V_B$ to a terminal F or a terminal R. The terminal F is connected to the neutral switch 15 by way of a diode 17, a reverse coil 1002 of the reverse relay 10' and another diode 18 while it is connected to the neutral switch 15 by way of a neutral indicator 19 formed from a lamp and a diode 20. The terminal R is connected to the aforementioned dimmer switch by way of a diode 21 while it is connected to a terminal 1 of an electronic control unit 22 by way of a power control coil 502 of the power control relay 5', to a terminal 2 of the electronic control unit 22 by way of a power control coil 602 of the power control relay 6, to a terminal 3 of the electronic control unit 22 by way of a speed limiter coil 702 of the speed limiter relay 7', and further to a power source terminal 4 for supplying power source current to the electronic control unit 22. The electronic control unit 22 individually grounds the terminal 1, terminal 2, and terminal 3 to excite the individual coils 502, 602 and 702 in accordance with a controlling method hereinafter described.

A connecting point between the starter magnetic switch 201 and the starter magnetic switch 301 is grounded by way of a starter magnetic coil 302 of the starter magnetic relay 3', a diode 23 and a reverse gear switch 24. The reverse gear switch 24 is a switch which is closed upon starting of the engine but is opened upon backward running or in a standby condition for the backward running of the vehicle when the aforementioned reverse gear of the mechanical transmitting mechanism operates.

The terminal F of the aforementioned reverse lever switch 16 is grounded also by way of the diode 17, the reverse coil 1002, a diode 25 and the reverse gear switch 24.

A starter magnetic regulator 26 is connected to the terminal R of the reverse lever switch 16 and a connecting point between the starter magnetic coil 202 and the reverse switch 1001 and controls current flowing through each of the relays after lapse of, for example, 0.3 seconds after the current has started to flow through the coil.

A reverse indicator 27 includes a lamp, and the battery voltage $V_B$ is supplied to an end of the reverse indicator 27 while the other end of the reverse indicator 27 is connected to a terminal 5 of the electronic control unit 22. The electronic control unit 22 grounds, upon backward (reverse) running of the vehicle, the terminal 5 to light the reverse indicator 27.

An oil pressure indicator 28 includes a lamp, and the battery voltage $V_B$ is supplied to an end of the oil pressure indicator 28 while the other end of the oil pressure indicator 28 is connected to a terminal 9 of the electronic control unit 22 and grounded by way of an oil pressure switch 29. The oil pressure switch 29 is a switch which is closed when the pressure of engine oil exceeds a predetermined value.

A terminal 6 of the electronic control unit 22 is connected to a connecting point between the diode 17 and the reverse coil 1002. The electronic control unit 22 allows the battery voltage $V_B$ to be supplied to the terminal 6 not only when the reverse lever switch 16 is connected to the terminal R and the power source is connected to the electronic control unit 22 but also when all of the requirements are satisfied that the reverse gear switch 24 is open and the vehicle is in a backwardly running condition or in a standby condition, that the clutch lever is operated so that the engaging relationship between the engine and the driving wheel is interrupted, that the side stand for allowing the autobicycle to stand by itself is in its accommodated condition, and that the shift lever of the transmission is at the neutral position. In particular, the battery voltage $V_B$ is supplied to the connecting point between the diode 17 and the reverse coil 1002.

The terminals of the electronic control unit 22 are operatively connected wherein the terminal 7 outputs a signal for controlling an operating condition of the starter magnetic regulator 26. A signal indicative of an operating condition of the start/reverse switch 9' is inputted to a terminal 8. A signal indicative of an operating condition of the oil pressure switch 29 is inputted to a terminal 9. A signal indicative of a voltage across the start/reverse motor 1' is inputted to a terminal 10. A signal indicative of presence or absence of fusion of the speed limiter fuse 8' is inputted to a terminal 11. A signal indicative of an operating condition of the neutral switch 15 is inputted to a terminal 12. A signal indicative of an operating condition of the side stand switch 13' and the clutch switch 12' is inputted to a terminal 13 and a terminal 14 is grounded.

Operation of the device for controlling the speed of rotation of a motor having such a construction as described above will be described subsequently.

First, when the engine is being prepared for starting and the reverse lever switch 16 is connected to the terminal F while the reverse gear switch 24 is in a closed state, current from the battery flows through the diode 17, reverse coil 1002, diode 25 and reverse gear switch 24 to close the reverse switch 1001. Meanwhile, if the neutral switch 15 is in a closed state, then current from the battery also flows through the neutral indicator 19, diode 20, and neutral switch 15 so that the neutral indictor 19 indicates that the shift lever of the transmission is in the neutral position If the start/reverse switch 9' is operated, upon such preparation for starting of the engine as described above, in order to start the engine, then the switch 902 is opened to interrupt the current supplied to the headlight to prepare for the supply of current to the start/reverse motor 1' upon starting when high current is required. Since the switch 901 is closed, current from the battery flows, when both of the clutch switch 12' and side stand switch 13' are in a closed state, through the starter magnetic coil 202, reverse switch 1001, diode 11', clutch switch 12' and side stand switch 13. However, the current flows, when the neutral switch 15 is in a closed condition, through the starter magnetic coil 202, reverse switch 1001, diode 14' and neutral switch 15. As current flows through the starter magnetic coil 202, the starter magnetic switch 201 is closed so that current from the battery flows through the starter magnetic switch 201, starter magnetic coil 302, diode 23 and reverse gear switch 24. As current flows through the starter magnetic coil 302, the starter magnetic switch 301 is closed so that current from the battery is supplied to the start/reverse motor 1' by way of the starter magnetic switch 201 and starter magnetic switch 301. Since the start/reverse motor 1' is in a mechanically connected condition to the engine crankshaft by way of the mechanical transmitting mechanism upon starting of the engine, the engine is started by a supply of current as described above.

Meanwhile, upon preparation for backward running of the vehicle (autobicycle), the reverse lever switch 16 is connected to the terminal R and the reverse gear switch 24 is opened, but in this instance, if the clutch switch 12', side stand switch 13' and neutral switch 15 are all in a closed state, then current from the battery is first supplied to the headlight by way of the diode 21 irrespective of operation of the start/reverse switch 9'. Meanwhile, current from the battery is supplied to a power source circuit of the electronic control unit 22 by way of the terminal 4 to cause the electronic control unit 22 to operate while the battery voltage $V_B$ is applied individually to the power control coil 502, power control coil 602 and speed limiter coil 702. Further, in such a condition as described above, since such requirements for the electronic control unit 22 to allow the battery voltage $V_B$ to be supplied to the terminal 6 as described above are satisfied, the battery voltage $V_B$ is supplied to the connecting point between the diode 17 and the reverse coil 1002. Accordingly, current flows through the reverse coil 1002, diode 18 and neutral switch 15 so that the reverse switch 1001 is closed.

If the start/reverse switch 9' is operated, upon preparation for the backward running of the vehicle as described above, in order to cause the vehicle to run backwardly, current from the battery flows through the starter magnetic coil 202, reverse switch 1001, diode 11', clutch switch 12' and side stand switch 13' while current flows through the starter magnetic coil 202, reverse switch 1001, diode 14' and neutral switch 15. As current flows through the starter magnetic coil 202, the starter magnetic switch 201 is closed. Upon backward running of the vehicle, since the reverse switch 24 is open, the starter magnetic switch 301 is not closed, and accordingly, current from the battery is supplied to the start/reverse motor 1' by way of the starter magnetic switch 201 and resistor circuit 4'. Upon backward running of the vehicle, since the start/reverse motor 1' is mechanically connected to the driving wheel of the vehicle in such a direction that the vehicle is to run backwardly, the vehicle runs backwardly upon such supply of current as described above.

The electronic control unit 22 individually grounds, in response to a voltage across the start/reverse motor 1', the terminals 1, 2 and 3 to individually close the power control switch 501, power control switch 601 and speed limiter switch 701 thereby to change the resistance value of the resistor circuit 4' to effect rotational speed control of the start/reverse motor 1'.

Such rotational speed control of the start/reverse motor 1' executed by the electronic control unit 22 will be described with reference to a program flow chart shown in FIG. 2.

Figure 4:
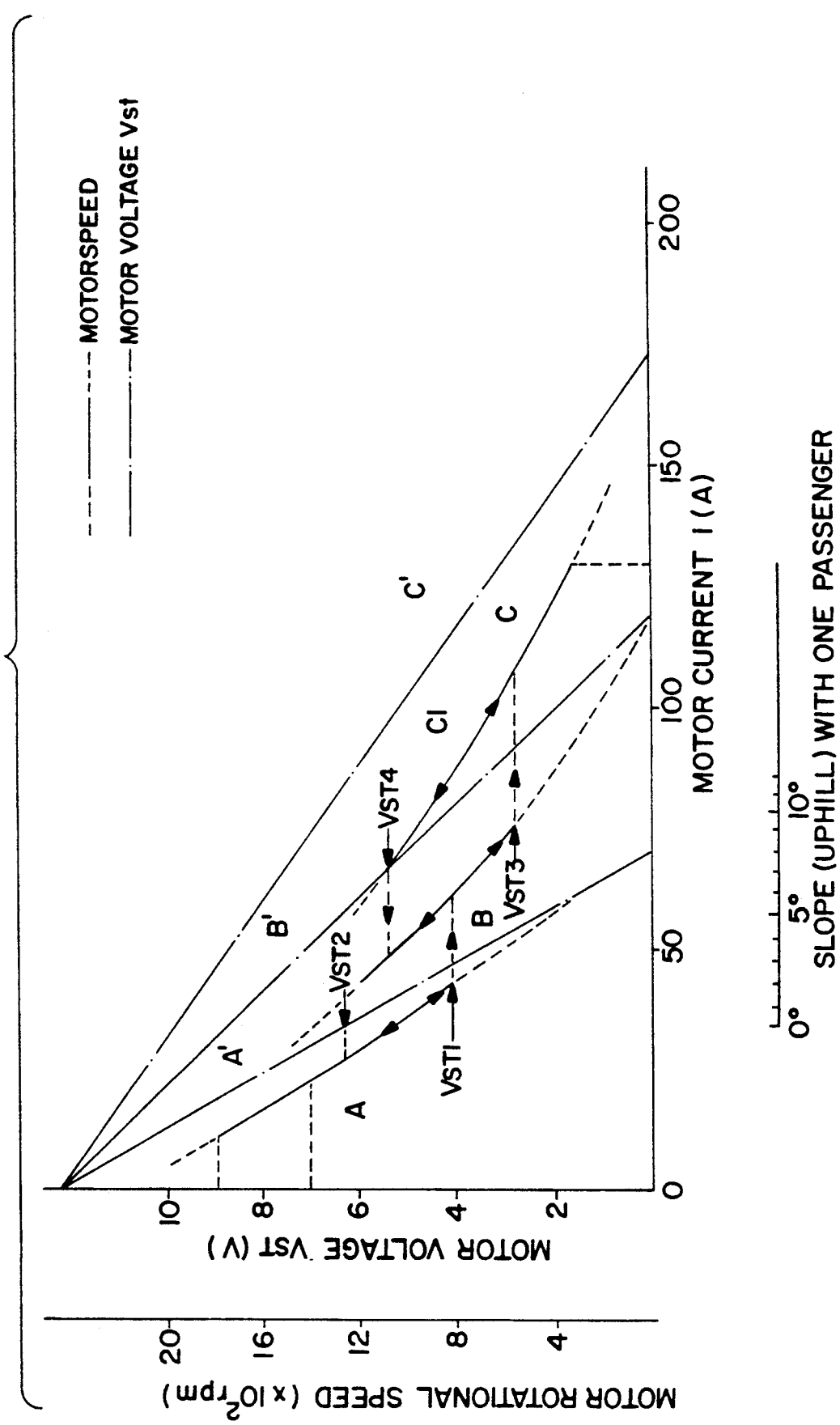
FIG. 4 is a graph illustrating changes of a motor current i and so forth with respect to time involved in the speed control flow chart shown in FIG. 2.

First, the present program is started when a power source current is supplied in response to closing of the ignition switch and connection of the reverse lever switch 16 to the terminal R, and initialization of the electronic control unit 22 is executed at step S201. At subsequent step S202, a voltage $V_{ST}$ applied across the start/reverse motor 1' is detected. Generally, the speed of rotation of a dc motor has a proportional corresponding relationship to a voltage applied across the motor. In particular, as shown in FIG. 4, when current flows only through the resistor 401 (150 mΩ) of the resistor circuit 4' with respect to motor current i, the motor rotational speed is represented by a curve A while the motor voltage $V_{ST}$ is represented by a curve A'. When current flows through a parallel circuit (75 mΩ) of the resistors 401 and 402, the motor rotational speed is represented by a curve B while the motor voltage $V_{ST}$ is represented by a curve B'. When current flows through a parallel circuit (50 mΩ) of the resistors 401, 402 and 403, the motor rotational speed is represented by a curve C while the motor voltage $V_{ST}$ is represented by a curve C'. Accordingly, by monitoring the motor applied voltage $V_{ST}$ instead of the speed of rotation of the motor, it is possible to execute rotational speed control of the motor, and the present invention adopts this method.

It is judged whether or not the thus detected motor voltage $V_{ST}$ exceeds a predetermined voltage (for example, 10.5V, corresponding to 1,800 rpm) to judge whether or not the motor rotational speed is an overspeed condition (step S203). If the answer is in the positive (Yes), that is, if the motor rotational speed is in an overspeed condition, then the terminal 3 of the electronic control unit 22 is grounded to energize the speed limiter coil 702 to close the speed limiter switch 701 (step S204). Consequently, if the starter magnetic switch 201 is in a closed state, then battery current flows through the starter magnetic switch 201, resister 401, resistor 403, speed limiter switch 70 and fuse 8' to reduce the voltage $V_{ST}$ to be applied across the motor to reduce the motor rotational speed. It is to be noted that the fuse 8' is provided for such an extraordinary condition that, when the speed limiter switch 701 is closed, the power control switch 601 is in a closed state (which will cause damage to the battery). After execution of the step S204, the sequence returns to step S202 by way of a step S209 which will be hereinafter described, and while the motor voltage $V_{ST}$ remains higher than the predetermined voltage, the steps S202, S203, S204 and S209 are repeated. However, if the motor voltage $V_{ST}$ becomes equal to or lower than the predetermined voltage, the sequence advances to step S205. It is to be noted that the sequence may not advance to step S205 until after the motor voltage $V_{ST}$ returns to a value equal to or lower than the predetermined voltage, for example, to 7.0 V.

If the answer at step S203 described above is in the negative (No), that is, if the motor rotational speed is not yet in an overspeed condition, then the sequence advances to step S205 at which it is judged whether or not current flowing through the motor is equal to or higher than a predetermined value, that is, the motor is in an overload condition. More particularly, it is judged whether or not the motor voltage $V_{ST}$ is lower than a predetermined overload value (for example, 3.1V, corresponding to 330 rpm). If the answer is in the positive (Yes), that is, if the motor is in an overload condition, then the electronic control unit 22 does not supply the battery voltage $V_B$ to the terminal 4, and consequently, the reverse switch 1001 is opened. Accordingly, the starter magnetic switch 201 is opened so that supply of current to the motor 1' is interrupted. Further, the electronic control unit 22 opens the terminal 5 to extinguish the reverse indicator 27. It is to be noted that the construction may be such that when the electronic control unit 22 does not supply the battery voltage $V_B$ to the terminal 4 to be maintained, for example, for 3 seconds, to wait cancellation of the overload condition. After execution of the step S206, the sequence returns to step S202 by way of the step S209 which will be hereinafter described.

If the answer at step S205 is in the negative (No), that is, the motor rotational speed is not in an overspeed condition and the motor is not in an overload condition, then it is judged whether or not the vehicle is in a condition in which it can make backward (reverse) running (step S207). In particular, it is judged whether or not all of the requirements are satisfied that the reverse gear switch 24 is open and the vehicle is in a backward running standby condition, that the clutch lever is operated so that the engaging relationship between the engine and the driving wheel is interrupted, that the side stand for allowing the autobicycle to stand by itself is in its accommodated condition and that the shift lever of the transmission is at the neutral position. If the answer is in the negative (No), that is, if the vehicle is not in a condition in which the vehicle can make a backward (reverse) running, the electronic control unit 22 does not supply the battery voltage $V_B$ to the terminal 6 (step S208), and the sequence advances to step S209.

The step S209 is an extraordinary condition watching step relying upon a so-called watch dog timer at which it watches a time till the step S209 is executed after execution of the step and judges, if the time exceeds a predetermined time, that there is some trouble in operation of the electronic control unit 22.

If the answer at step S207 described above is in the positive (Yes), that is, the vehicle is in a condition wherein it can make backward running, then the electronic control unit 22 supplies the battery voltage $V_B$ to the terminal 6, that is, supplies the battery voltage $V_B$ to the connecting point between the diode 17 and the reverse coil 1002 to close the reverse switch 1001 (step S210).

Subsequently, it is judged whether or not the start-/reverse switch 9' is manually operated (step S211), and if the answer is in the negative (No), the sequence advances to step S208, but on the contrary if the answer is in the positive (Yes), that is, if the switch S901 is closed in addition to the fact that the reverse switch 1001 is closed, then the starter magnetic switch 201 is closed (step S212). Simultaneously with this operation, at step S212, a starting control time counter, a power control relay I counter and a power control relay II counter each constituted from an up counter which will be hereinafter described are set to zero and then started only when the starter magnetic switch 210 is changed from an open state to a closed state.

Subsequently, it is judged whether or not the elapsed time after the starting point of backward running of the vehicle is equal to or shorter than a starting control time (for example, 1.3 seconds), that is, whether or not the starting control time counter is still counting such 1.3 seconds (step S213). If the answer is in the negative (No), that is, if the starting control time has elapsed already, then the sequence advances to step S221 at which vehicle speed control which will be hereinafter described is executed. If the answer at step S213 is in the positive (Yes), then it is judged whether or not the count value of the power control relay I counter is equal to or shorter than 0.5 seconds (step S214). Then, if the answer is in the negative (Yes), that is, if 0.5 seconds do not yet elapse after the vehicle has started its backward running, the sequence advances to step S215. At step S215, the electronic control unit 22 does not ground the terminal 1 nor the terminal 2, and accordingly, the power control switches 501 and 601 remain in an open state and current flows only through the resistor 401 (150 mΩ). After execution of the step S215, the sequence advances to step S209 without executing vehicle speed control at step S221. In the meantime, if the answer at step S214 is in the negative (No), that is, if 0.5 seconds have already elapsed after the vehicle has started its backward running, then it is judged whether or not the motor voltage $V_{ST}$ exceeds a predetermined voltage PCI (for example, 4.8V, corresponding to 800 rpm) (step S216). If the answer is in the positive (Yes), the sequence advances to step S221 at which vehicle speed control which will be hereinafter described is executed, but if the answer is in the negative (No), then the sequence advances to step S217.

At step S217, it is judged whether or not the count value of the power control relay II counter is equal to or shorter than 1.2 seconds, and if the answer is in the positive (Yes), that is, if 0.5 seconds have elapsed but 1.2 seconds have not yet elapsed after the vehicle has started its backward running, the sequence advances to step S218 at which the electronic control unit 22 grounds the terminal 1 to close the power control switch 501 but does not ground the terminal 2 so that the power control switch 601 is not opened. Accordingly, current flows through a parallel circuit (75 mΩ) of the resistors 401 and 402. After execution of the step S218, the sequence advances to step S209 without executing vehicle speed control at step S221. In the meantime, if the answer at step S217 is in the negative (No), that is, if 1.2 seconds have already elapsed after the vehicle has started its backward running, then it is judged whether or not the motor voltage $V_{ST}$ exceeds a predetermined voltage PC2 (for example, 1.4V, corresponding to 550 rpm) lower than the predetermined voltage PC1 mentioned hereinabove (step S219). If the answer is in the positive (Yes), then the sequence advances to step S221 at which vehicle speed control which will be hereinafter described is executed, but if the answer is in the negative (No), then the sequence advances to step S220 at which the electronic control unit 22 grounds the terminal 1 and the terminal 2 to close the power control switches 501 and 601. Accordingly, current flows through a parallel circuit (50 mΩ) of the resistors 401, 402 and 403. After execution of the step S220, the sequence advances to step S209 without executing vehicle speed control at step S221.

It is to be noted that, while three counters including the starting control time counter, power control relay I counter and power control relay II counter are provided in the construction described above, they can be constituted from a single counter which measures an elapsed time after the vehicle has started its backward running.

The starting control by the steps S213 to S220 described above will be described with reference to graphs of the motor voltage $V_{ST}$ with respect to the motor current i and of the elapsed time T with respect to the motor current i shown in FIG. 3.

Figure 3A:
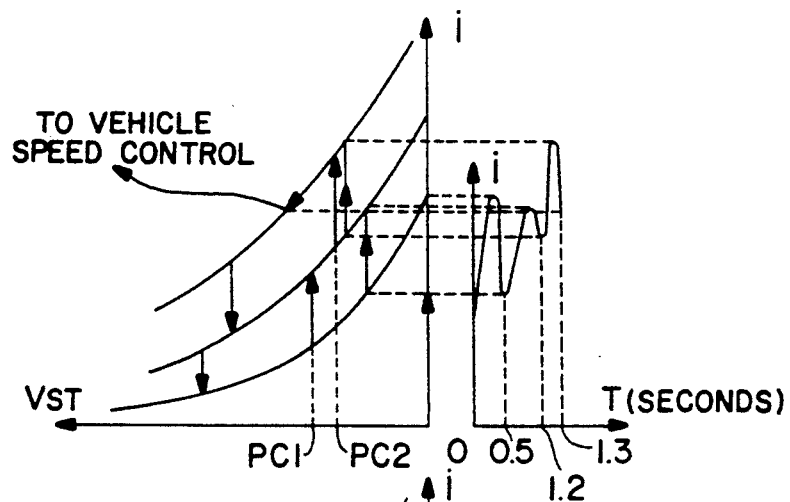
FIGS. 3(a)-3(d) are graphs illustrating changes in a motor current amount i and so forth with respect to time in response to a motor load involved in starting control flow chart shown in FIG. 2.

FIG. 3(a) shows variations of the motor current i and the motor voltage $V_{ST}$ with respect to time when the rising of the motor rotational speed after starting of backward running of the vehicle is very slow, that is, when the motor load is high. FIG. 3(c) shows variations of the motor current i and the motor voltage $V_{ST}$ with respect to time when the rising of the motor rotational speed is very fast, that is, when the motor load is low.

Figure 3B:
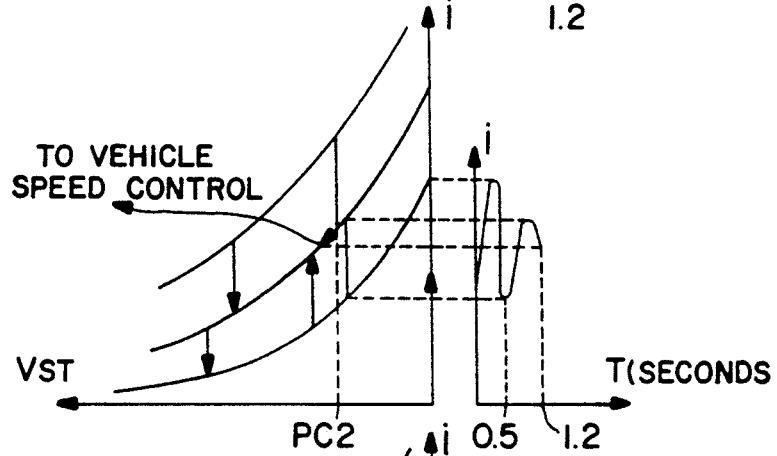
Figure 3C:
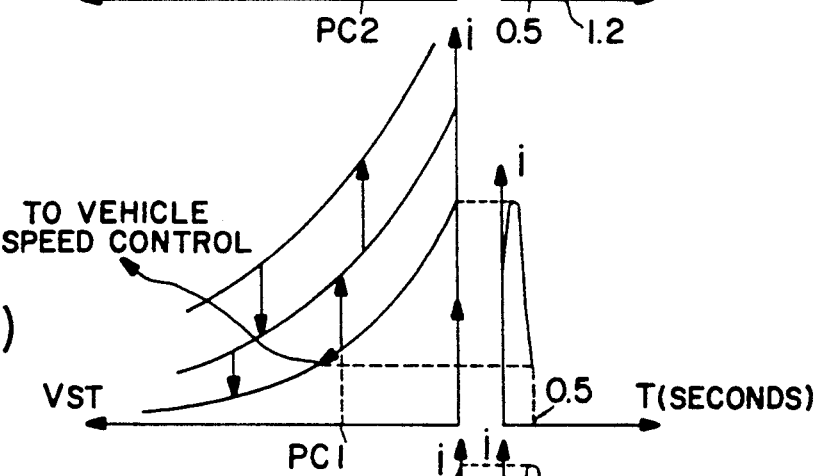

FIG. 3(b) shows variations of the motor current i and the motor voltage $V_{St}$ with respect to time when the motor rotational speed (motor load) presents a value intermediate between FIG. 3(a) and FIG. 3(b).

In particular, in FIG. 3(a), current flows only through the resistor 401 (150 mΩ) for 0.5 seconds after starting of backward running of the vehicle (step S215). Since the motor rotational speed does not reach, after lapse of 0.5 seconds, a motor rotational speed corresponding to the predetermined motor voltage PCI, it is judged that the motor load is high, and current is caused to further flow through the resistors 401 and 402 (75 mΩ) for 0.7 seconds (0.5 to 1.2 seconds after starting of backward running of the vehicle) (step S218). Since the motor rotational speed does not reach, after the lapse of 0.7 seconds, a motor rotational speed corresponding to the predetermined motor voltage PC2, it is judged that the motor load is further higher, and current is caused to further flow through the resistors 401, 402 and 403 (50 mΩ) for 0.1 second (1.2 to 1.3 seconds after starting of backward running of the vehicle) (step S220), whereafter vehicle speed control will be hereinafter described is executed (step S221). The graph of the elapsed time T with respect to the motor current i on the right-hand side indicates a variation of the motor current i for 1.3 seconds after starting of backward running of the vehicle.

In FIG. 3(b), current flows only through the resistor 401 (150 mΩ) for 0.5 seconds after starting of backward running of the vehicle (step S215). Similarly, as illustrated in FIG. 3(a), since the motor rotational speed does not reach, after 0.5 seconds, a motor rotational speed corresponding to the predetermined motor voltage PC1, it is judged that the motor load is higher, and current is caused to further flow through the resistors 401 and 402 (75 mΩ) for 0.7 seconds (0.5 to 1.2 seconds after starting of backward running of the vehicle) (step S218). As a result, since the motor rotational speed exceeds a motor rotational speed corresponding to the predetermined motor voltage PC2, vehicle speed control is executed (step S221). The graph of the elapsed time T with respect to the motor current i on the right-hand side indicates a variation of the motor current i for 1.2 seconds after starting of backward running of the vehicle.

In FIG. 3(c), current flows only through the resistor 401 (150 mΨ) for 0.5 seconds after starting of backward running of the vehicle (step S215) similarly as in the cases of FIGS. 3(a) and 3(b), as a result, since the motor rotational speed exceeds a motor rotational speed corresponding to the predetermined motor voltage PCl, vehicle speed control is executed (step S221). The graph of the elapsed time T with respect to the motor current i on the right-hand side indicates a variation of the motor current i for 0.5 seconds after starting of backward running of the vehicle.

Figure 3D:
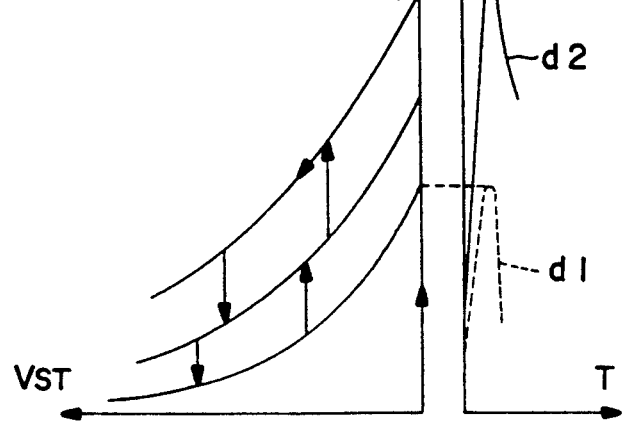

As described so far, if the motor load is high upon starting of backward running of the vehicle, then the resistance value of the resistor circuit ' is successively changed over to a lower resistance value to increase the motor current i, thereby preventing the motor current from flowing by an excessive amount to damage the motor and so forth. As shown in FIG. 3(d), comparing with the motor current amount i in the case wherein the starting control by the steps S213 to S220 is not executed (solid line d2), the motor current amount i in the case wherein the starting control is executed (broken line d1) is considerably low, and accordingly, it can be prevented to cause the motor current to flow by an excessive amount at an initial stage of starting of the motor to damage the motor and so forth.

Referring back to FIG. 2, vehicle speed control at step S221 will be described with reference to FIG. 4.

In FIG. 4, a motor voltage of the curve A at which the motor voltage is changed over from the curve A to the curve B is set to a predetermined value $V_{ST1}$ (for example, 4.8V, corresponding to 800 rpm), and a voltage of the curve B at which the motor voltage is changed over from the curve B to the curve A is set to another value $V_{ST2}$ (for example, 8.3V, corresponding to 1,240 rpm). In particular, the predetermined motor voltages $V_{ST1}$ and $V_{ST2}$ are set such that the motor current i (for example, 39A) at the predetermined motor voltage $V_{ST2}$ of the curve B may be lower than the motor current i (for example, 42A) at the predetermined motor voltage $V_{ST1}$ of the curve A. Similarly, a motor voltage of the curve B at which the motor voltage is changed over from the curve B to the curve C is set to a predetermined value $V_{ST3}$ (for example, 4.4V, corresponding to 550 rpm), and a voltage of the curve C at which the motor voltage is changed over from the curve C to the curve B is set to another value $V_{ST4}$ (for example, 7.6V, corresponding to 1,100 rpm). In particular, the predetermined motor voltages $V_{ST3}$ and $V_{ST4}$ are set such that the motor current i (for example, 67A) at the predetermined motor voltage $V_{ST4}$ may be lower than the motor current i (for example, 76A) at the predetermined motor voltage $V_{ST3}$.

After completion of the starting control described above, the electronic control unit 22 individually grounds the terminals 1 and 2 in response to a detected motor voltage $V_{ST}$ to change over the resistance value of the resistor circuit 4'. As a result, when the motor current amount i reaches a motor current amount corresponding to a motor load, that is, when the actual driving torque coincides with a required torque required for the motor, changing over of the resistance value of the resistor circuit 4' is stopped.

In particular, if it is assumed, for example, that current flows only through the resistor 401 of the resistor circuit 4' upon completion of the starting control described above (the curve A is applied) and the required torque is a torque amount which corresponds to a current amount at a C1 point of the curve C. Then the motor current i increases along the curve A so that it may reach the current amount. When the motor voltage $V_{ST}$ decreases to the predetermined voltage $V_{ST1}$, the power control switch 501 is closed, and accordingly, current flows through a parallel circuit (75 mΩ) of the resistors 401 and 402 so that the motor current i is changed over from the curve A to the curve B. Since even the motor current amount i on the curve B corresponding to the predetermined voltage $V_{ST1}$ does not reach a current amount at the C1 point, the motor current i is increased along the curve B so as to reach the current amount at the C1 point. When the motor voltage $V_{ST}$ is decreased to reach the predetermined voltage $V_{ST3}$, also the power control switch 601 is closed. Accordingly, current flows through a parallel circuit (50 mΩ) of the resistors 401, 402 and 403 so that the motor current i is changed over from the curve B to the curve C.

Since the motor current amount i on the curve C corresponding to the predetermined voltage $V_{ST3}$ is higher than the current amount at the C1 point, the motor current i is decreased along the curve C so that it reaches the current amount at the C1 point. Consequently, the required torque and the actual driving torque coincide with each other, and the variation of the motor current i is stopped. The required torque and the actual driving torque are made to coincide with each other in this manner, and the motor rotational speed is kept substantially constant.

It is to be noted that, even when the required torque is a torque amount corresponding to a value between the motor current amount (39A) on the curve B at the predetermined motor voltage $V_{ST2}$ and the motor current amount (42A) on the curve A at the predetermined motor voltage $V_{ST1}$, the curve A or the curve B can be applied. Accordingly, the driving torque can be made to coincide with the required torque. Further, even when the required torque is a torque amount corresponding to a value between the motor current amount (67A) on the curve C at the predetermined motor voltage $V_{ST4}$ and the motor current amount (76A) on the curve B at the predetermined motor voltage $V_{ST3}$, the curve B or the curve C can be applied. Accordingly, the driving torque can be made to coincide with the required torque.

After execution of the step S221, the sequence returns to step S202 by way of the step S209.

In the foregoing, while the present invention is described in connection with the embodiment wherein it is applied to the backward running device for a vehicle such as an autobicycle, the present invention is not limited to this and can be applied not only to a motor controlling device for the forward running of an electric automobile but also to a simple controlling device for a popular motor which has a variation in load.

As described in detail so far, according to the present invention, a method of controlling the speed of rotation of a motor by changing the resistance value of a resistor circuit connected in series to the motor and having discontinuous resistance values is characterized in that an applied voltage applied across the motor is detected and, when the applied voltage detected is lower than a first applied voltage and the resistance value of the resistor circuit is a first resistance value, the resistance value of the resistor circuit is changed over to a second resistance value lower than the first resistance value. However, when the applied voltage detected is higher than a second applied voltage higher than the first applied voltage and the resistance value of the resistor value is the second resistance value, the resistance value of the resistor circuit is changed over to the first resistance value, and the first applied voltage and the second voltage are set such that the current flowing through the motor by the first applied voltage is higher than the current flowing through the motor by the second applied voltage. Accordingly, even with the simple controlling device which employs the resistor circuit wherein the resistance value changes discontinuously, the motor rotational speed can be kept substantially constant irrespective of a variation of a load to the motor. Consequently, an inexpensive motor rotational speed device of a simple structure can be provided.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for controlling the speed of rotation of a motor used for rearward driving of an autobike by changing a resistance value of a resistor circuit connected in series to the motor and having a plurality of resistors connected in parallel to provide various resistance values, comprising the following steps:
   (a) providing a first predetermined voltage and a second predetermined voltage, the second predetermined voltage being higher than the first predetermined voltage to permit current flowing to the motor when the first predetermined voltage is applied to the motor to be higher than current flowing to the motor when the second predetermined voltage is applied to the motor;
   (b) applying a voltage across the motor;
   (c) changing the resistance value of the resistor circuit to a second resistance value, the second resistance in parallel to than a first resistance value by adding resistors in parallel to the resistor circuit, after a first period of time has elapsed since the voltage applied to the motor has been detected to be lower than the first predetermined voltage and the resistance value of the resistor circuit is the first resistance value, thereby increasing the current flowing to the motor; and
   (d) changing the resistance value of the resistor circuit to the first resistance value by removing resistors in parallel from the resistor circuit after a second period of time has elapsed, the first period of time being of a different duration than the second period of time, since the voltage applied to the motor has been detected to be higher than the second predetermined voltage and the resistance value of the resistor circuit is the second resistance value, thereby decreasing the current flowing to the motor.

2. The method as claimed in claim 1, wherein the first predetermined voltage is approximately 4.8 volts corresponding to approximately 800 rpm.

3. The method as claimed in claim 1, wherein the second predetermined voltage is approximately 8.3 volts corresponding to approximately 1,240 rpm.

4. The method as claimed in claim 1, wherein the first predetermined voltage is approximately 4.4 volts corresponding to approximately 550 rpm.

5. The method as claimed in claim 1, wherein the second predetermined voltage is approximately 7.6 volts corresponding to approximately 1,100 rpm.

6. A system for controlling a rotational speed of a motor used for a vehicle by changing a resistive value of a resistor circuit connected in series between the motor and a battery comprising:
   a motor;
   a power source for supplying a voltage and a current to said motor;
   control means for controlling an amount of current being applied to said motor;
   said control means including a circuit of a plurality of resistors connected in parallel, said circuit of parallel resistors being connected in series between said motor and said power source, each resistor being connected to a switch which switches, independently of other switches connected to other resistors in said circuit of parallel resistors, the resistor in and out of the parallel circuit;
   said control means switching a resistor into the parallel circuit, after a predetermined elapse of time, when said current being applied to said motor is to be increased such that each resistor is switched into the parallel circuit after a corresponding predetermined period of time has elapsed, each corresponding period of time being different from each other.

7. The system as claimed in claim 6 wherein said control means detects the voltage being applied to said motor;
   said control means switching a resistor into the parallel circuit after a first period of time has elapsed since the detected voltage is lower than a first predetermined voltage.

8. The system as claimed in claim 7 wherein said control means switches a resistor out of the parallel circuit after a second period of time has elapsed, the first period of time being different from the second period of time, since the detected voltage is higher than a second predetermined voltage;
   said second predetermined voltage being higher than said first predetermined voltage.

9. The system as claimed in claim 6, further comprising:
   timer means for establishing the different period of times.

10. The system as claimed in claim 8, wherein said first predetermined voltage corresponds to said motor rotating at 800 rpm.

11. The system as claimed in claim 10, wherein said second predetermined voltage corresponds to said motor rotating at 1,240 rpm.

12. The system as claimed in claim 8, wherein said first predetermined voltage corresponds to said motor rotating at 550 rpm.

13. The system as claimed in claim 12, wherein said second predetermined voltage corresponds to said motor rotating at 1,100 rpm.

14. A system for controlling a rotational speed of a motor used for a vehicle by changing a resistive value of a resistor circuit connected in series between the motor and a battery comprising:
   a motor;
   a power source for supplying a voltage and a current to said motor; and
   a controller for controlling an amount of current being applied to said motor;
   said controller including a circuit of a plurality of resistors connected in parallel, said circuit of parallel resistors being connected in series between said motor and said power source, each resistor being connected to a switch which switches the resistors in and out of the parallel circuit;
   said controller switching a resistor into the parallel circuit, after a predetermined elapse of time, when said current being applied to said motor is to be increased such each resistor is switched into the parallel circuit after a corresponding period of time has elapsed, each corresponding period of time being different from each other.

15. The system as claimed in claim 14 wherein said controller detects the voltage being applied to said motor;
   said controller means switching a resistor into the parallel circuit after a first period of time has elapsed since the detected voltage is lower than a first predetermined voltage.

16. The system as claimed in claim 15 wherein said controller switches a resistor out of the parallel circuit after a second period of time has elapsed, the first period of time being different from the second period of time, since the detected voltage is higher than a second predetermined voltage;

said second predetermined voltage being higher than said first predetermined voltage.

17. The system as claimed in claim 14, further comprising:

a timer for establishing the different period of times.

18. The system as claimed in claim 16, wherein said first predetermined voltage corresponds to said motor rotating at 800 rpm.

19. The system as claimed in claim 18, wherein said second predetermined voltage corresponds to said motor rotating at 1,240 rpm.

20. The system as claimed in claim 16, wherein said first predetermined voltage corresponds to said motor rotating at 550 rpm.

21. The system as claimed in claim 20, wherein said second predetermined voltage corresponds to said motor rotating at 1,100 rpm.

22. A method for controlling a rotational speed of a motor used for a vehicle by changing a resistive value of a resistor circuit connected in series between the motor and a battery comprising the steps of:

(a) supplying a voltage and a current to the motor;

(b) controlling an amount of current being applied to the motor by using a circuit of a plurality of resistors connected in parallel, the circuit of parallel resistors being connected in series between the motor and a power source; and (c) switching a resistor into the parallel circuit after a delay when the current being applied to the motor is to be increased such each resistor is switched into the parallel circuit after a corresponding period of time has elapsed, each corresponding period of time being different from each other.

23. The method as claimed in claim 22 further comprising the steps of:

(d) detecting a voltage being applied to the motor; and (e) switching a resistor into the parallel circuit in a hysteresis manner after a first period of time has elapsed since the detected voltage is lower than a first predetermined voltage.

24. The method as claimed in claim 23 further comprising the steps of:

(f) switching a resistor out of the parallel circuit after a second period of time has elapsed, the first period of time being different from the second period of time, since the detected voltage is higher than a second predetermined voltage, the second predetermined voltage being higher than the first predetermined voltage.

25. The method as claimed in claim 24, wherein the first predetermined voltage corresponds to the motor rotating at 800 rpm.

26. The method as claimed in claim 25, wherein the second predetermined voltage corresponds to the motor rotating a at 1,240 rpm.

27. The method as claimed in claim 24, wherein the first predetermined voltage corresponds to the motor rotating at 550 rpm.

28. The method as claimed in claim 27, wherein the second predetermined voltage corresponds to the motor rotating at 1,100 rpm.

29. The system as claimed in claim 6 wherein said resistors are independently switched into and out of the parallel circuit to adjust the resistive value of the parallel circuit.

30. The system as claimed in claim 14 wherein said resistors are independently switched into and out of the parallel circuit to adjust the resistive value of the parallel circuit.

* * * * *